United States Patent
Wu

(10) Patent No.: US 6,827,447 B2
(45) Date of Patent: Dec. 7, 2004

(54) RECORDABLE PROJECTOR

(75) Inventor: Chung-Wei Wu, Taipei Hesin (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 10/452,740

(22) Filed: Jun. 2, 2003

(65) Prior Publication Data

US 2004/0196436 A1 Oct. 7, 2004

(30) Foreign Application Priority Data

Apr. 4, 2003 (TW) ...................................... 92205328 U

(51) Int. Cl.⁷ ............................................. G03B 21/14
(52) U.S. Cl. ....................................................... 353/15
(58) Field of Search ............................. 353/15, 18, 19, 353/119, 122; 345/961, 978

(56) References Cited

U.S. PATENT DOCUMENTS

| | | | | |
|---|---|---|---|---|
| 5,218,389 A | * | 6/1993 | Harlon et al. ................ | 353/122 |
| 5,541,680 A | * | 7/1996 | Fromm ........................ | 353/122 |
| 5,630,659 A | * | 5/1997 | Ronzani et al. ............... | 353/15 |
| 6,550,922 B2 | * | 4/2003 | Bogomolnyi ............... | 353/122 |
| 6,626,543 B2 | * | 9/2003 | Derryberry ................. | 353/119 |

* cited by examiner

*Primary Examiner*—William C. Dowling

(57) ABSTRACT

A recordable projector mainly comprises: a set of video/audio input terminals used to receive output signals from a video/audio output device; a projector device used to project animation pictures on a screen; a set of speakers used to output voice; a voice receiver used to receive voice from outside; and, a video/audio recorder/player used for recording and playing video and audio data. The video/audio input terminals, the projector device, the speakers, the voice receiver and the video/audio recorder/player are all integrated into one body. Thereby, video and audio recording and playing can be processed in the projector according to the present invention.

8 Claims, 1 Drawing Sheet

RECORDABLE PROJECTOR

BACKGROUND OF THE INVENTION

1. Field of the Invention

The present invention relates to a recordable projector, and more particularly to a recordable projector that integrates a projector device and video/audio recorder/player device into one body.

2. Description of Related Art

A general projector is only used to project data in a computer or images in a video/audio output device to an outside screen, and without functions to replay or file these data and images. Therefore, replaying them is impossible, once they are played. Once a recording and playing effect is expected to attain, several video/audio facilities must be bought and whole cables arrangement must be redone, this cost money, time and energy.

SUMMARY OF THE INVENTION

The present invention integrates a set of video/audio input terminals, a projector device, a set of speakers, a voice receiver device and a video/audio recorder/player into a housing. The projector is used to project animation pictures on an outside screen. The speakers are used to broadcast voice out. The voice receiver is used to receive output voices from outside. And, the video/audio recorder/player is used to record or play video/audio data. The most important thing is that the video/audio terminals, the projector device, the speakers, the voice receiver and the video/audio recorder/player are all integrated into one body.

Therefore, the main object of the present invention is to provide a recordable projector, combining a projector with a recorder. When a program is projected from the projector, the video and the audio signals of the program can be recorded concurrently.

Another object of the present invention is to provide a recordable projector can project current market available video/audio video for entertainment and teaching.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
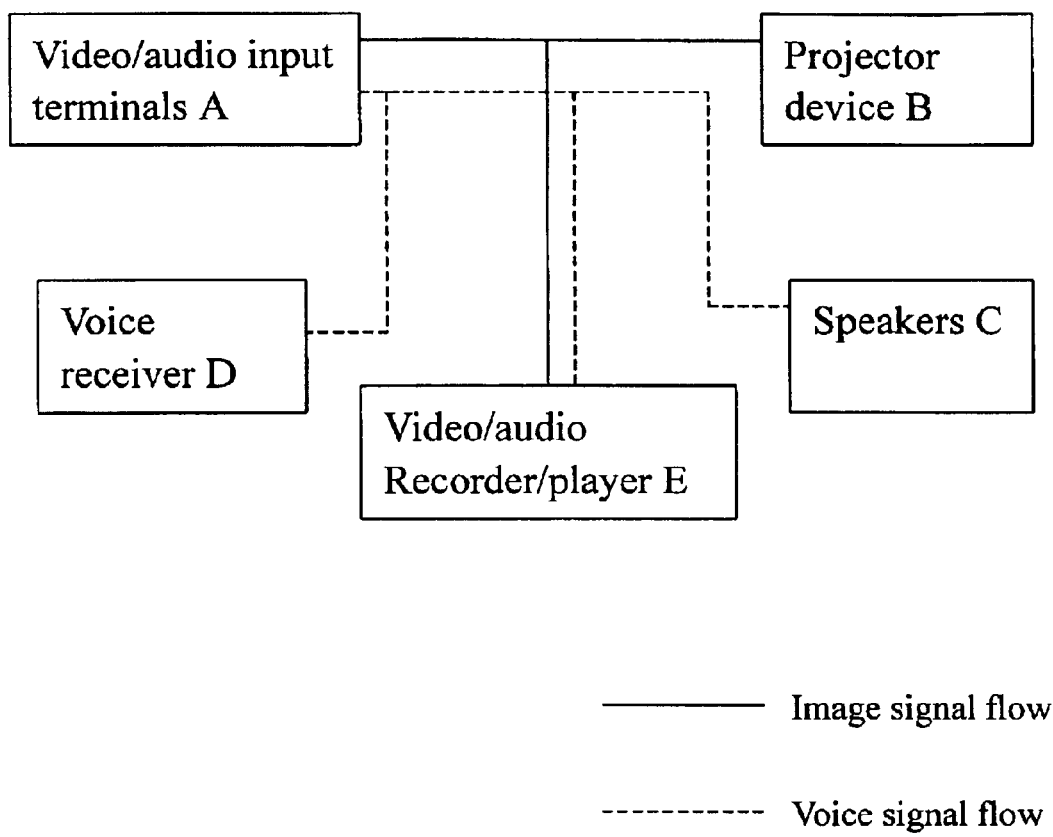
FIG. 1 is a circuit diagram, showing a structure of a recordable projector according to a preferred embodiment of the present invention.

Please refer to FIG. 1. FIG. 1 is a circuit diagram, showing a structure of a recordable projector according to a preferred embodiment of the present invention. In the FIGURE, two elements connected with a solid line can process a video signal communication between them; two elements connected with a dotted line can process an audio signal communication between them. A recordable projector comprises a set of video/audio input terminals A, a projector device B, a set of speakers C, a voice receiver device D and a video/audio recorder/player. Here, the video/audio input terminals, the projector device B, the speakers C and the voice receiver D are connected with the video/audio recorder/player respectively, and integrated therewith to form a structure of one body. The video/audio input terminals are used to receive output signals from a video/audio output device, such as a computer or television station selector. The projector device B is used to project animation images onto an outside screen (not shown in the FIGURE). The speakers C is used to output voices to outside. The voice receiver is used to receive outside voice. The video/audio recorder/player E can record and play video and audio data, and can use a general specification media such as a VHS, VCD or DVD depending on necessity.

If a recordable projector according to the present invention is used as a computer projector, connect the video/audio input terminals A to a computer (not shown in the FIGURE). Thereafter, the image in the computer is projected onto an outside screen (not shown in the FIGURE) through the projector device B. Thereby, the image in the computer can be played directly. If a concurrent video/audio recording is needed, activate the video/audio recorder E, record the video signals input from the video/audio input terminals A and the audio signals input from the voice receiver D to a storage media such as a VHS tape, VCD or DVD disk.

If a recordable projector according to the present invention is used as a home cinema projector, the video/audio input terminals A is connected to a television station selector. The image from a television station is projected onto an outside screen (not shown in the FIGURE) through the projector device B, and voice is broadcast from the speakers C. If a concurrent video/audio recording is needed, the video/audio recorder E is activated to record the video/audio signals input from the video/audio input terminals A to a storage media such as a VHS tape, VCD or DVD disk.

The recorded media mentioned above can be played through the video/audio recorder/player E, and the image and voice can be broadcasted through the projector device B and the speakers C respectively.

And, of course, a projector according to the present invention can be used as a normal projector projecting a current market available mass media program tape or disk.

It is noted that the recordable projector described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A recordable projector, comprising in combination:
   a set of video/audio input terminals for receiving output signals from a video/audio output device;
   a projector device for projecting animation pictures onto an outside screen;
   a set of speakers, used to output voice to outside;
   a voice receiver, used to receive outside voices;
   a video/audio recorder/player for recording and playing video/audio data;
   said video/audio input terminals, said projector device and said video/audio recorder/player are communicated with video signals;
   said video/audio input terminals, said speakers, said voice receiver and said video/audio recorder/player are communicated with audio signals so as to process video/audio recording or playing; and
   said video/audio input terminals, said projector device, said speakers, said voice receiver and said video/audio recorder/player are integrated into one body.

2. The recordable projector according to claim 1, wherein said video/audio output device is a computer, said video/ audio input terminals can be connected to said computer, images of said computer are projected onto an outside screen through said projector device.

3. The recordable projector according to claim 1, wherein said video/audio input terminals can be connected to a station selector of said television, images of said television are projected onto a screen through said projector device, voices of said television is broadcasted through said speakers.

4. The recordable projector according to claim 2, wherein said video/audio recorder/player is used to record concurrently input video signals from said video/audio input terminals and input audio signals from said voice receiver to a storage medium.

5. The recordable projector according to claim 3, wherein said video/audio recorder/player is used to record concurrently input video and audio signals from said video/audio input terminal to a storage medium.

6. The recordable projector according to claim 4 wherein said storage medium is selected from the group consisting of VHS tape, VCD or DVD.

7. The recordable projector according to claim 4 wherein said recorded video and audio signals can be re-played though said video/audio recorder/player and re-broadcasted though said projector device and said speakers.

8. The recordable projector according tom claim 1 wherein a market available recorded medium can be played through said video/audio recorder/player.

* * * * *